United States Patent [19]

Suzuka et al.

[11] Patent Number: 4,613,947

[45] Date of Patent: Sep. 23, 1986

[54] METHOD OF MEASURING COLOR DIFFERENCE OF DYESTUFFS

[75] Inventors: Masakazu Suzuka, Ibaraki; Hiromu Ohashi, Sakai; Yukio Murata, Takatsuki; Nobuyoshi Fujitsuka, Ibaraki, all of Japan

[73] Assignee: Sumitomo Chemical Company, Limited, Osaka, Japan

[21] Appl. No.: 577,021

[22] Filed: Feb. 6, 1984

[30] Foreign Application Priority Data

Jun. 14, 1983 [JP] Japan .................................. 58-107340

[51] Int. Cl.$^4$ ........................ G01N 21/25; G01J 3/50
[52] U.S. Cl. .................................. 364/526; 356/405; 356/408; 356/410; 364/554
[58] Field of Search ............. 364/496, 498, 502, 526, 364/554; 356/405, 408–410, 425

[56] References Cited

U.S. PATENT DOCUMENTS

| | | | |
|---|---|---|---|
| 3,601,589 | 8/1971 | McCarty | 364/526 |
| 4,090,243 | 5/1978 | Kotera et al. | 364/526 |
| 4,267,572 | 5/1981 | Witte | 364/498 |
| 4,365,303 | 12/1982 | Hannah et al. | 364/498 |
| 4,402,611 | 9/1983 | Yuasa | 364/526 |
| 4,439,038 | 3/1984 | Mactaggart | 364/526 X |
| 4,455,084 | 6/1984 | Webb, Jr. et al. | 364/498 X |

Primary Examiner—Errol A. Krass
Assistant Examiner—Kevin J. Teska
Attorney, Agent, or Firm—Stevens, Davis, Miller & Mosher

[57] ABSTRACT

A method for measuring the color difference beteween a sample dye and a standard dye by testing the color properties of both dyes, which comprises determining, in advance, the relation of the color difference of dyeings (between the standard dye and the dyes of the same family) to the color difference of dye solution (between a standard dye and the dyes of the same family) using the standard dye and two or more, preferably several, representative samples arbitrarily selected from plural lots of dyes, then calculating the color difference of dye solution between the standard dye and a sample dye, and predicting the color difference of dyeings from the calculated color difference of dye solution by referring to the relation obtained.

5 Claims, 13 Drawing Figures

METHOD OF MEASURING COLOR DIFFERENCE OF DYESTUFFS

This invention relates to a method for measuring the color difference of dyestuffs. More particularly, it relates to a method for measuring the color difference, which is useful for the quality control of dyestuffs in the dye manufacturing industry.

At present in dye manufacturing works, the quality control is performed by dyeing an appropriate material with freshly manufactured dye and, in parallel, with a reference dye selected as standard, and measuring the quality different between the dyed materials. For instance, when using equal amount of a dye selected as standard (hereinafter referred to as standard dye) and a dye to be measured for the color difference (hereinafter referred to as sample dye), dyeing is carried out simultaneously, there occurs in most cases a difference in the depth of color between each dyed material depending upon the coloring matter content of each dye. In order to correct the color difference resulting from the difference in the depth of color, the concentration of dye in the bath is adjusted so that the depth of color of the dyeings may be equalized. The color properties of a dye is evaluated based on the color difference between the dyeings obtained by use of the adjusted bath. This color difference is resolvable into the difference in hue such as, for example, inclination to red or inclination to blue, and the difference in so-called brightness which is dependent on the purity of color. The evaluation of a dye by human visual judgement is usually done in terms of three values including the difference in hue, the difference in brightness, and, in addition, the dyeing strength which is the percentage ratio of the quantities of dyes or concentrations of dyebaths necessary for the dyeings of equal hue depth. In the conventional test for color properties of a sample dye in comparison with those of a standard dye, it is a usual practice to carry out a sequence of procedual steps comprising preparation of dye solution, dyeing, washing, and drying for both dyes simultaneously and then compare the dyeings with each other. Since such a method consumes a great deal of time and man-power, there is a rising requirement for a method which is more economical, rapid, and capable of predicting the result of dyeing.

The present inventors, therefore, made an extensive study by using numeral experimental data to answer the above requirement and, as a result, accomplished the present invention.

This invention provides a method for measuring the color difference between a sample dye and a standard dye by testing the color property of both dyes, which comprises the steps of isolating from dyes of the same family each of the coloring matter components having a dyeing affinity, which have the possibility of existing in the dye; measuring the spectral absorbance or spectral transmittance of each component in solution form to obtain data 1 to be filed; preparing or selecting two or more dyes having such compositions that the proportions of the coloring matter components are different to some degrees from those of the sample dye, then quantitatively analyzing said prepared or selected dyes and a standard dye (a dye assumed to be a standard for comparison) for their coloring matter compoentns; calculating the spectral absorbance or spectral transmittance of each of said prepared or selected dyes and said standard dye by the method of color mixing calculation in accordance with the composition of each dye using the results of above quantitative analysis and the filed data of spectral absorbance or spectral transmittance of each coloring matter component; calculating by the ordinary color difference calculation method the color difference in solution between each of said prepared or selected dyes and the standard dye; performing the dyeing test on said prepared or selected dyes and the standard dye to determine the color difference by colorimetry; determining statistically the numerical relationship between the color difference of dye solution and the color different of dyeings to acquire data 2 (the data 1 and 2 being the base data to be collected in advance for the purpose of using in the subsequent evaluation of color); after collecting the foregoing data 1 and 2, analyzing quantitatively the sample dye for its coloring matter components; calculating the tristimulus values of the solution of sample dye from the results of said quantative analysis and the spectral absorbance of each coloring matter component (data 1); calculating the color difference in solution from the calculated tristimulus values and the tristimulus values of the standard dye (which are determined previously or simultaneously; and converting the calculated color difference of solution into the color difference of dyeings by means of the determined relationship between the color difference of solution and the color difference of dyeings (data 2).

More particularly, this invention provides a method for measuring the color difference between a sample dye and a standard dye by testing the color properties of both dyes, which comprises determining, in advance, the relation of the color difference of dyeings (between the standard dye and the dyes of the same family) to the color difference of dye solution (between a standard dye and the dyes of the same family) by the following procedures described below in (2), (3) and (4) using the standard dye and two or more, preferably several, representative samples, then calculating the color difference of dye solution between the standard dye and a sample dye as described below in (5), and predicting the color difference of dyeings from the calculated color difference of dye solution by referring to the relation obtained in (4) as described below in (6).

(1) Each of the components contained in the dye of the same family is separated and collected separately by chromatography. Each separated component is measured for the distribution curve of absorbance and from this curve a distribution curve of absorbance per unit of each component content is derived. At this stage, any correction can be made by the use of a weighting factor pertaining to the dyeing affinity or the like.

(2-1) The calculation for color mixing is performed by using the distribution curve of absorbance per unit of content obtained in (1) and the results of quantitative analysis of the separated components with respect to the standard dye and representation samples of the same family as that of the standard dye. The correction by the weighting factor is made at this stage unless it has been made in (1).

A color coordinate system representing the value of color property unaffected by the variation in concentration of the solution, such as the values of complementary chromaticity coordinates is selected. Complementary tristimulus values $QX$, $QY$, $QZ$ are calculated for the standard dye and the sample dye by the common method of calculating the tristimulus values using the absorbance in place of the transmittance. From the calculated complementary tristimulus values, there are obtained complementary chromaticity coordinates xQ, yQ and the integrated optical density SQ.

(2-2) A dye (which can be the standard dye) is selected from the dyes of the same family and tristimulus values X, Y and Z are calculated from its spectral transmittance curve. These values are then transformed into a suitable uniform color scale. In the coordinate diagram of this color system, four sets of tristimulus values given by a chromaticity point when it undergoes a change of one unit independently in hue difference and in saturation or brightness difference are calculated and the corresponding transmittance curve is derived by color mixing calculation. The transmittance curve is transformed into the distribution curve of absorbance to obtain the complementary chromaticity coordinates of each chromaticity point. From the difference between these coordinates and the complementary chromaticity coordinates of the dye selected above, the relation of the hue and saturation or brightness difference to the difference in complementary chromaticity coordinates in the uniform color scale is established.

By referring to the relationship established above, the color difference of solution of the representative sample relative to the standard dye is calculated in terms of hue difference and saturation difference or brightness difference.

The above operation is repeated on two or more, preferably several, representative dyes different in proportions of coloring matter components.

(3) Dyeings are prepared from the standard dye and the representative samples of which the color difference of solution has been determined above. From the dyeings, there is obtained the color difference (in terms of hue difference and saturation or brightness difference) of the representative dye relative to the standard dye.

(4) The relationship between the color difference of dye solution determined in (2) and the color difference of dyeings determined in (3) is found in terms of hue difference and saturation or brightness difference.

(5) Using the standard dye and the sample dye, the color difference of solution of the sample dye relative to the standard dye is calculated in terms of hue difference and saturation or brightness difference, as described in (2).

(6) The color difference of dyeings of the sample dye is predicted from the color difference of solution of the sample dye obtained in (5) and the relationship established in (4).

According to the present invention, it becomes possible to predict the color difference of dyeings from the results of quantitative analysis for dye components without needing the complicated dyeing test. The advantages of the present method may be summarized as follows:

(a) The exclusion of a series of procedures for the dyeing test results in speed-up and simplification of operation steps and savings in man-power and energy.

(b) The conventional method for the evaluation of color difference by the dyeing test includes a number of factors which tend to decrease precision of the evaluation, such as differences in the type and shape of the material to be dyed, variation in the evaluation results caused by the variation in dyeing procedure and dyeing equipment, visual judgement susceptible to difference among observers, etc., whereas the precisio is much improved in the present invention by the preclusion of such factors.

(c) Since the color difference of a sample dye is found precisely and speedily, the method is applicable to the process control in the dye manufactory with accompanying pronounced economic advantages such as reduction of defective products, curtailment of the waiting time, etc.

(d) The present method can be widely utilized in the developmental stage of novel dyestuffs, resulting in speed-up of the research work.

(e) Requirement from the user of a dye for a change in hue can be quickly answered.

In the present method described above, step (1) can be omitted when all of the coloring matter components in a sample dye can be dyeable.

Brief description of the accompanying drawings is given below.

In FIGS. 1 and 2, the encircled figure corresponds to the step number described above.

FIG. 2 is a flow chart for the measurement of color difference of dye solution. Step (1) is a step to find color properties (in solution) of the components constituting a dye. If all coloring matter components in a dye can be dyeable, this step can be omitted. Step (2) is a step to find directly the distribution curve of absorbance by the color mixing of the components constituting a dye and to find the color difference of dye solution from the relationships between the hue difference as well as brightness difference and the complementary chromaticity coordinates. If all of the coloring matter components can be dyeable, it is possible to omit the separation and quantitative determination of each component contained in the dye of the same family as well as the correction with weighting factors pertaining to the dyeing affinity and the like, and to use directly the distribution curve of absorbance.

FIGS. 3 to 11 are graphs pertaining to C.I. Disperse Blue 301 and FIG. 13 is a graph pertaining to C.I. Disperse Blue 79.

In FIG. 5, 0 is a point of chromaticity diagram of the standard dye and 1, 2, 3 and 4 are chromaticity points when the chromaticity point 0 undergoes independently a change of one unit.

As chromatographs used in the present method, metnion may be made of column chromatograph, paper chromatograph, and liquid chromatograph. Of these, a high speed liquid chromatograph is especially advantageous. The adjustment of measurements by weighting with respect to dyeing affinity and other factors should be made in step (1) or (2-1).

A typical procedure of the present method in which the liquid chromatography is used as a means of separation is described below in further detail with reference to the drawings.

(1) Each of the components contained in the dye of the same family is separated and collected by high speed liquid chromatography; each separated component is measured for the distribution curve of absorbance, and from this curve a distribution curve of absorbance in the form of color property per unit of each separated component content is derived.

(2) Next, the calculation for color mixing is performed according to the following set of equations [1] or [2], using the absorbance per unit of content and the correction factor for the dyeing affinity (hereinafter referred to as dyeing coefficient) of each separated component with respect to the standard dye and the representative sample. The calculation is carried out by means of a computer.

$$\left. \begin{array}{l} Dst, \lambda = \sum_{n=1}^{n=n} Dn\lambda pn, st\ Sn \\ \\ Dsp, \lambda = \sum_{n=1}^{n=n} Dn\lambda pn, sp\ Sn \end{array} \right\}, \quad [1]$$

wherein st and sp refer to standard dye and representative individual components, pn is a value obtained by dividing the individual component content by the main component content and multiplying by 100 (hereinafter referred to as ratio of individual components to main component), each content being obtained by the method of peak area normalization, $Dn\lambda$ is a value obtained by dividing the absorbance of separate individual component by pn, $\lambda$ being 200–800 nm, and Sn is the dyeing coefficient of individual component.

$$\left. \begin{array}{l} *xQ(n) = xQ(n) + \{*xQ(n-1) - xQ(n)\} \times \\ \qquad \{*SQ(n-1)/(*SQ(n-1) + SQ(n))\} \\ *yQ(n) = yQ(n) + \{*yQ(n-1) - yQ(n)\} \times \\ \qquad \{*SQ(n-1)/(*SQ(n-1) + SQ(n))\} \\ *SQ(n) = *SQ(n-1) + SQ(n) \end{array} \right\}, \quad [2]$$

wherein n is the number of separated individual components, xQ and yQ are complementary chromaticity coordinates, and the mark * means mixed complenetary chromaticity coordinates.

Figure 1:
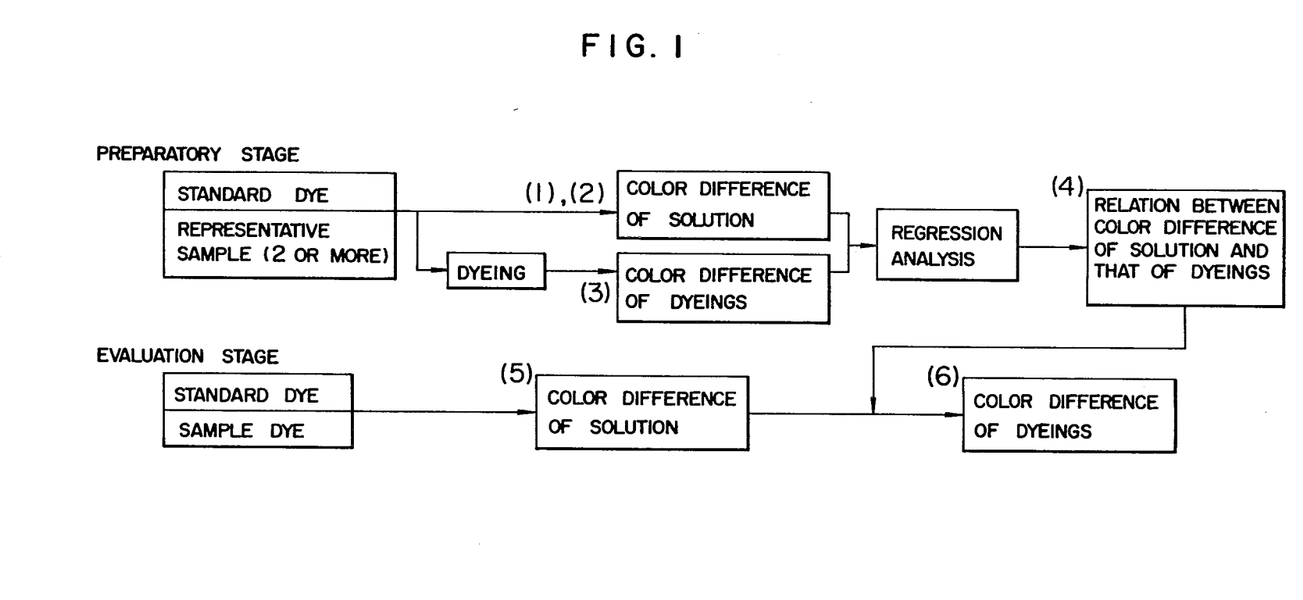
FIG. 1 is a flow chart of the entire procedural steps of the present method.
Figure 2:
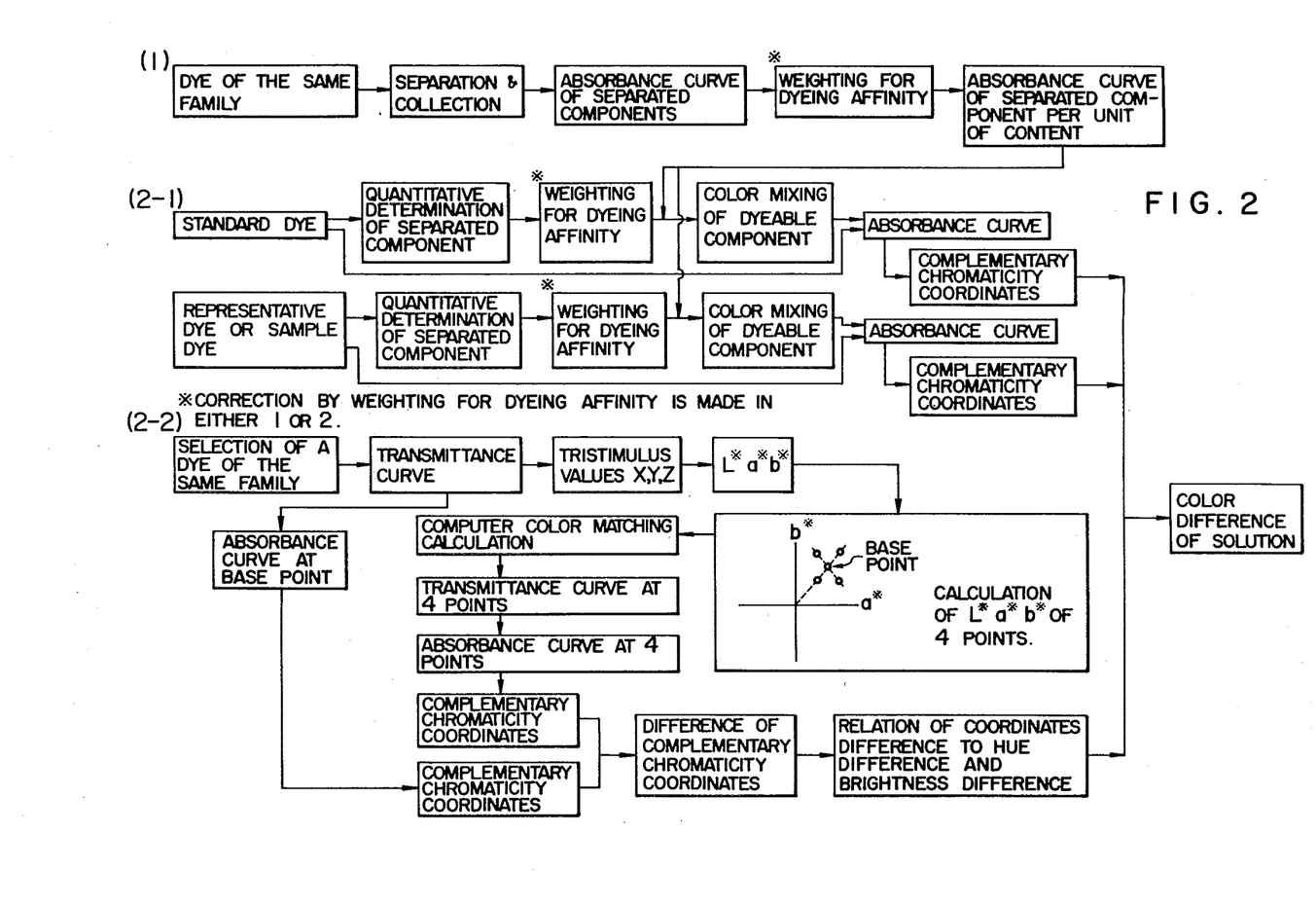
Figure 3:
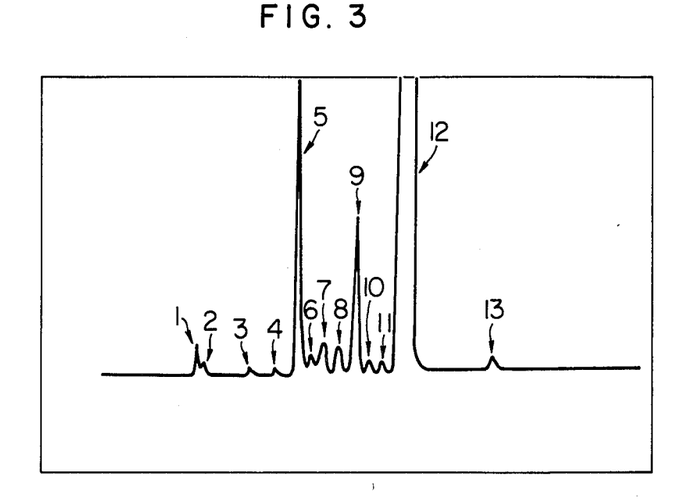
FIG. 3 is a liquid chromatography.

FIG. 3 is an example of liquid chromatogram showing the separation of components contained in a blue dye. In Table 2 given later, are shown absorbances per unit of content in the visible spectrum range corresponding to individual components contained in the dye. From the results of color mixing the complementary tristimulus values, QX, QY and QZ are calculated by the following general formulas [3].

$$\left. \begin{array}{l} QX = \int P\lambda\ \bar{x}\lambda\ D\lambda\ d\lambda \\ QY = \int P\lambda\ \bar{y}\lambda\ D\lambda\ d\lambda \\ QZ = \int P\lambda\ \bar{z}\lambda\ D\lambda\ d\lambda \end{array} \right\}, \quad [3]$$

wherein $\bar{x}\lambda$, $\bar{y}\lambda$ and $\bar{z}\lambda$ are spectral tristimulus values such as those shown in CIE 1964 supplementary colorimetric system —X, Y, Z color system for 10° visual field or CIE 1931 standard colorimetric system—X, Y, Z color system for 2° visual field or in other literature; $P\lambda$ is relative spectral energy distribution of standard illuminant such as a light source widely used in color evaluation of dyes, (usually $D_{65}$); $\lambda$ is wavelength; and $d\lambda$ is the wavelength interval of spectrum for the integral calculation, usually 10 or 20 nm, the latter interval being used herein.

Using the above results the complementary chromaticity coordinates xQ and yQ and the integrated optical density, SQ, are computed by the following formulas [4].

$$\left. \begin{array}{l} SQ = QX + QY + QZ \\ xQ = QX/SQ \\ yQ = QY/SQ \end{array} \right\}, \quad [4]$$

Figure 4:
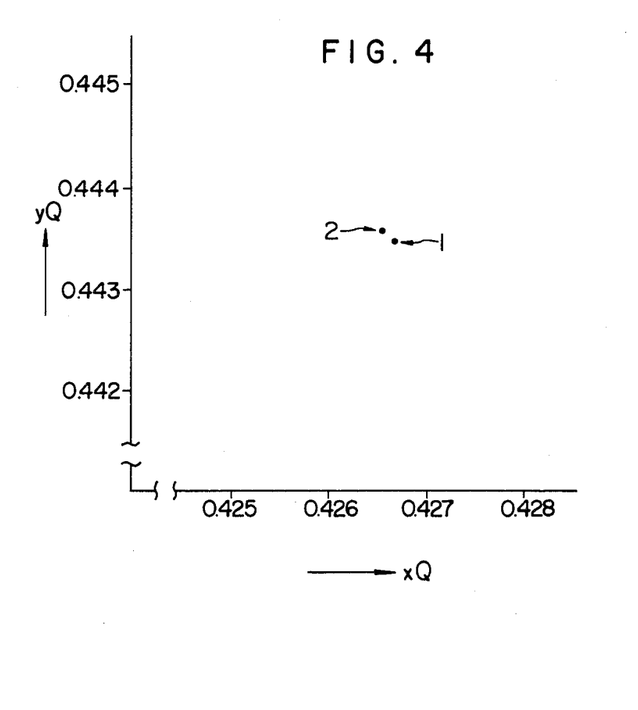
FIGS. 4 and 13 are complementary chromaticity diagrams, wherein 1 refers to the standard dye and 2 to the representative sample.

A complementary chromaticity diagram, as shown in FIG. 4, is obtained by plotting the above results.

The reasons for the choice of complementary chromaticity coordinates are as follows:

(a) Since the absorbance is proportional to concentration, the ratios among QX, QY and QZ remain constant even if the concentration is variable.

(b) The calculation of color mixing can be done additively on the chromaticity diagram and the trend of color difference becomes easier to understand.

The distribution curve of absorbance of the dye in the same family, such as, for example, the standard dye, is transformed by the following formula [5] to the transmittance curve and tristimulus values X, Y and Z are calculated according to the following formulas [6].

$$T\lambda = 1/Exp(D\lambda 0.4343) \quad [5]$$

$$\left. \begin{array}{l} X = k\int P\lambda\ \bar{x}\lambda\ T\lambda\ d\lambda \\ Y = k\int P\lambda\ \bar{y}\lambda\ T\lambda\ d\lambda \\ Z = k\int P\lambda\ \bar{z}\lambda\ T\lambda\ d\lambda \\ k = 100/\int P\lambda\ \bar{y}\lambda\ d\lambda \end{array} \right\} \quad [6]$$

The tristimulus values X, Y and Z are then transformed by use of the formula [7] to CIE 1976 L*a*b* colorimetric system.

$$\left. \begin{array}{l} L^* = 116(Y/Yo)^{\frac{1}{3}} - 16 \\ a^* = 500[(X/Xo)^{\frac{1}{3}} - (Y/Yo)^{\frac{1}{3}}] \\ b^* = 200[(Y/Yo)^{\frac{1}{3}} - (Z/Zo)^{\frac{1}{3}}] \end{array} \right\} \quad [7]$$

When the standard luminant is $D_{65}$ and the vision field is 10°, $x_o$, $y_o$ and $z_o$ become as follows:

$x_o = 94.811$
$y_o = 100.0$
$z_o = 107.334$

Figure 5:
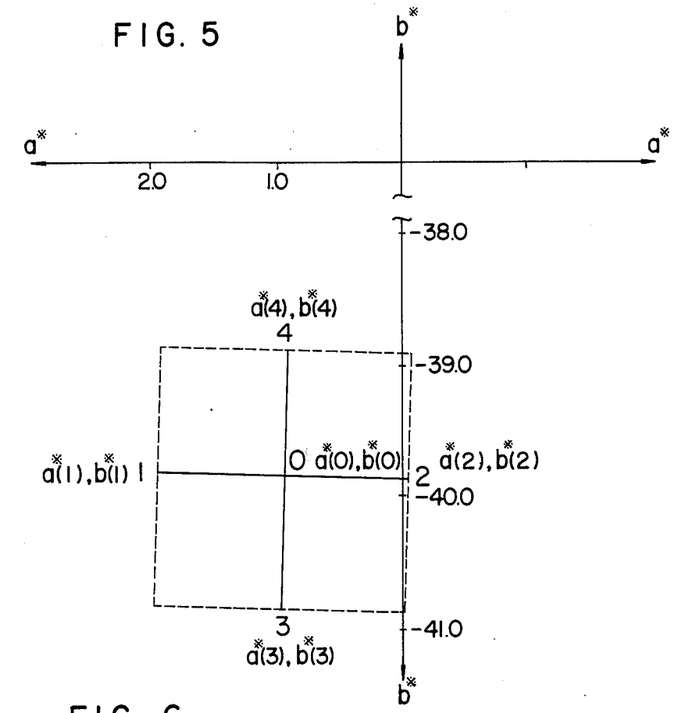
FIG. 5 is a chromaticity diagram according to CIE 1976 L*a*b* color system.
Figure 6:
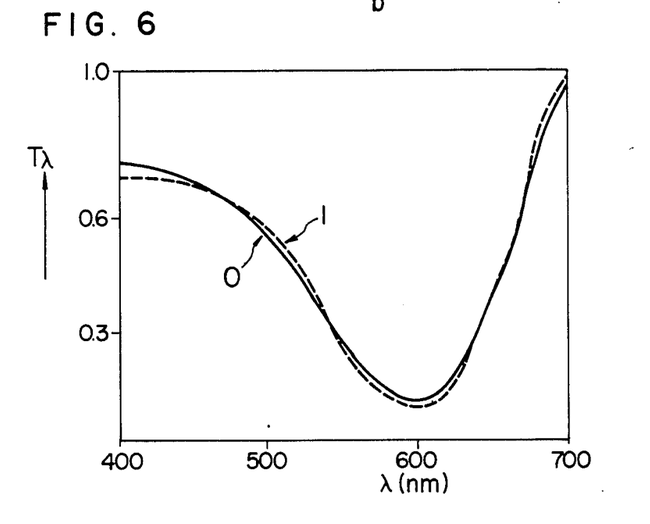
FIGS. 6 to 9 are spectral transmittance curves corresponding to the chromaticity points shown in FIG. 5, wherein 0, 1, 2, 3 and 4 correspond to chromaticity points in FIG. 5, respectively.
Figure 7:
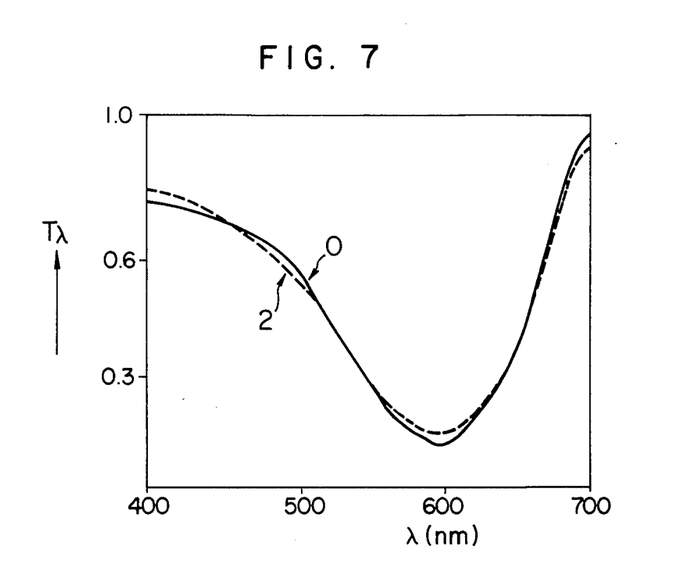
Figure 8:
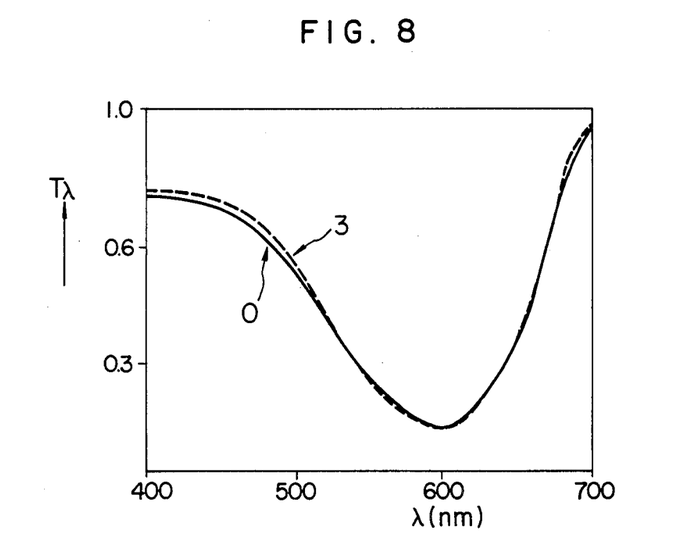
Figure 9:
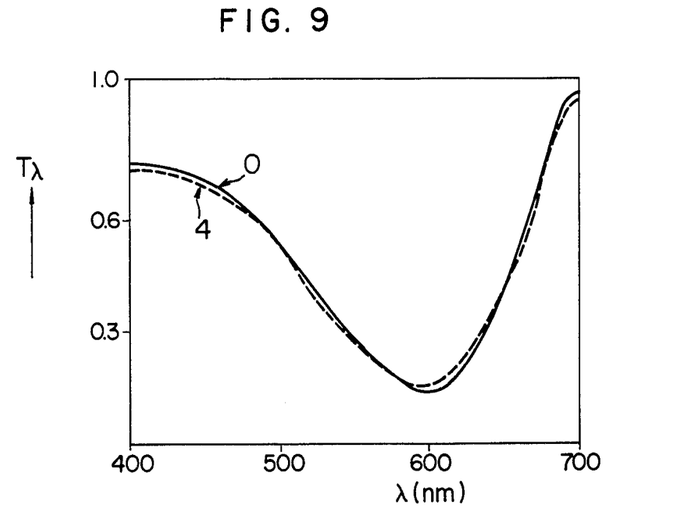
Figure 10:
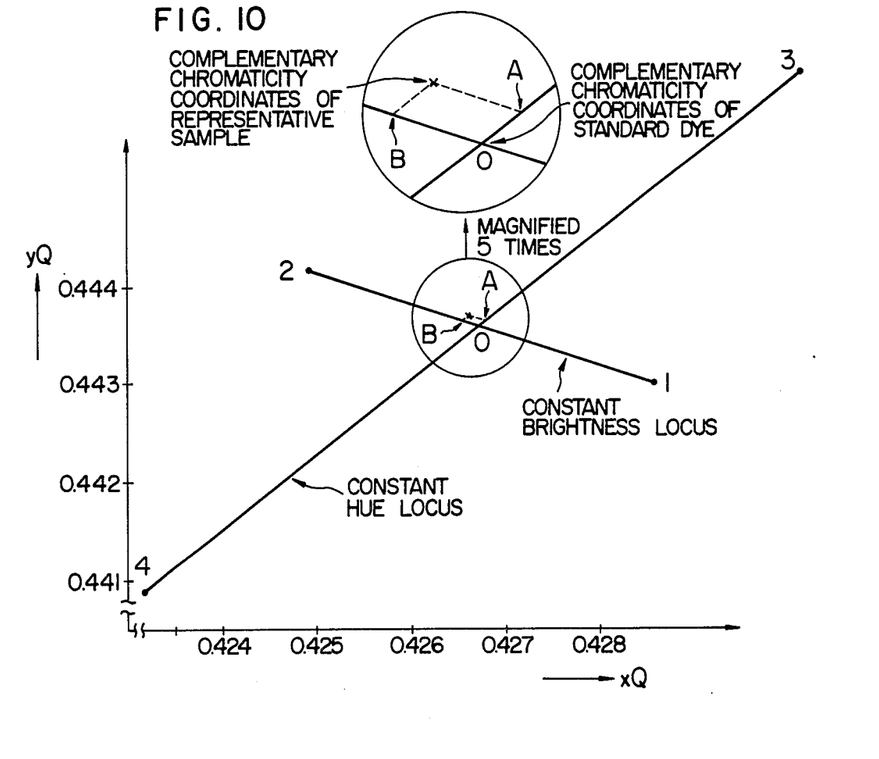
FIG. 10 represents interrelationships of the differences in complementary chromaticity coordinates derived from FIGS. 6–9, wherein 0 refers to the standard dye; 1, 2, 3 and 4 are complementary chromaticity coordinates corresponding to one unit of color difference in solution; and x is complementary chromaticity coordinates of the representative sample.

In the a*b* chromaticity coordinates diagram of the colorimetric system shown in FIG. 5, four chromaticity points, [a* (1), b*(1)]. . . [a*(4), b*(4)], are given when the chromaticity point [a*(0), b*(0)] representing a hue difference and a saturation or brightness difference undergoes independently a change of one unit. Four sets of tristimulus values [X(1), Y(1), Z(1)]. . . [X(4), Y(4), Z(4)] corresponding to the above four chromaticity points are calculated by the reverse transformation of equations [7]. Spectral transmittance curve Tλ corresponding to each set of tristimulus values is computed by the method of computer color matching calculation or other means (FIGS. 6 to 9). These Tλ curves are transformed to the distribution curves of absorbance by reverse transformation of equation [5]. The complementary chromaticity coordinates of each chromaticity point are calculated from the formulas [3] and [4]. The relation between these coordinates and the difference between the complementary chromaticity coordinates of the standard dye, [xQ(0), yQ(0)] and the complementary chromaticity coordinates [xQ(1), yQ(1)]...[xQ(4), yQ(4)] obtained above is determined (FIG. 10).

Based on these relationships shown in FIG. 10, a straight line passing through complementary chromaticity coordinaes of the representative sample is drawn in parallel with the straight line passing through the chromaticity points 1, 0 and 2 (hereinafter referred to as constant brightness locus) until it intersects at A the straight line passing through the chromaticity points 3, 0, and 4 (hereinafter referred to as constant hue locus). Another straight line passing through the complementary chromaticity coordinates is drawn in parallel with the constant hue locus until it intersects the constant brightness locus at B. The coordinates of A and B are thus found. The color difference of dye solution is obtained from the coordinaes of A and B and the following formulas [8].

$$\left. \begin{array}{l} \text{Hue difference of dye solution} = \dfrac{\text{Length of segment between chromaticity points 0 and } B}{\text{Length of segment between chromaticity points 0 and 2}} \\ \\ \text{Brightness difference of dye solution} = \dfrac{\text{Length of segment between chromaticity points 0 and } A}{\text{Length of segment between chromaticity points 0 and 3}} \end{array} \right\} \quad [8]$$

The above operation is repeated on two or more, preferably several, representative samples to determine the color difference of each sample.

(3) Customary dyeing test is performed on the standard dye and the same representative samples as used above. The difference of dyeing color of each representative sample from that of the standard dye is measured in terms of hue difference and saturation or brightness difference.

(4) The relation between the color difference of dye solution and the color difference of dyeings is statistically determined in the form of regression line (FIG. 11) or in other forms.

(5) The color difference of dye solution between the standard dye and the sample dye is determined in the same manner as in (2).

(6) It is thus possible to predict the color difference of dyeings in terms of hue difference and brightness difference from the color difference of dye solution of the sample dye obtained in (5) by referring to the relation established in (4).

The invention is illustrated below with reference to Examples, in which all parts are by weight.

EXAMPLE 1

Measurement of Color Difference of Representative Sample Solution

Color Index (C.I.) Disperse Blue 301 is separated into individual components by means of a high speed liquid chromatograph under the following conditins of separation. The dye solution for injection is prepared by dissolving 0.12 part of the dye in acetonitrile and making up to 100 parts with the same solvent.

Conditions for high speed liquid chromatographic separation:
  Column: Lichrosorb $RP_{18}$ (Sumika Analytical Center Co.)
  Mobile phase:
    Liquid A: Water
    Liquid B: Acetonitrile
  Elution: Gradient method
    The concentration of liquid B is increased from the starting concentration of 60% to 70% after 20 minutes, then to 100% after subsequent 15 minutes.
  Flow rate: 1 ml/minute.
  Monitering wavelength: 592 nm
  Sample volume: 5 μl The content of each component is determined by the method of peak area normalization and the ratio of each separated component to the main component is calculated (Table 1).

Figure 12:
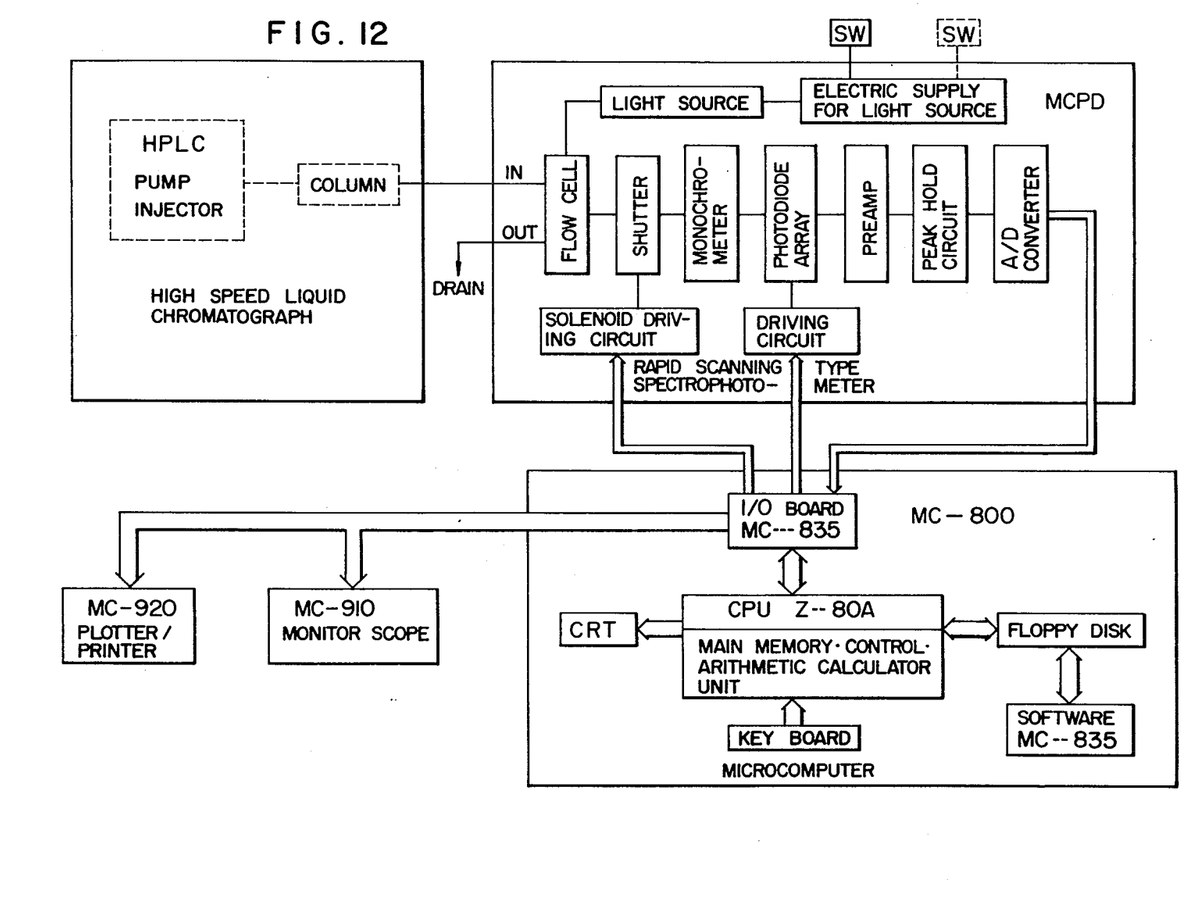
FIG. 12 is a drawing illustrating the construction of the absorbance measuring system using a spectrophotometer of the rapid scanning type.

In the next step, each of the separated components is measured for the distribution curve of absorbance in the visible spectrum range by means of a rapid scanning spectrophotometer shown in FIG. 12. The distribution curve of absorbance per unit of content is constructed by plotting the quotient obtained by dividing absorbance by the ratio of individual component to main component (hereinafter this quotient is referred to as absorbance coefficient). In Table 2 are shown absorbance coefficients ($D_n\lambda$) of each component thus obtained (wavelength interval is 20 nm).

TABLE 1

| Component | Ratio of individual component to main component, % |
|---|---|
| 1 | 6.27 |
| 2 | 2.32 |
| 3 | 0.12 |
| 4 | 1.22 |
| 5 | 9.14 |
| 6 | 0.39 |
| 7 | 4.71 |
| 8 | 3.93 |
| 9 | 34.16 |
| 10 | 0.84 |
| 11 | 4.04 |
| 12 | 100.00 |
| 13 | 0.86 |

TABLE 2

| Wavelength, nm | Component No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| 400 | 0.0011 | 0.0021 | 0.0033 | 0.0016 | 0.0019 | 0.001 | 0.0019 | 0.0040 | 0.0020 | 0.0030 | 0.0032 | 0.0015 | 0.0003 |
| 420 | 0.0011 | 0.0035 | 0.0042 | 0.0013 | 0.0022 | 0.0015 | 0.0024 | 0.0068 | 0.0022 | 0.0035 | 0.0043 | 0.0017 | 0.0005 |
| 440 | 0.0010 | 0.0047 | 0.0067 | 0.0014 | 0.0025 | 0.0018 | 0.0032 | 0.0119 | 0.0023 | 0.0038 | 0.0059 | 0.0019 | 0.0007 |
| 460 | 0.0009 | 0.0047 | 0.0075 | 0.0020 | 0.0030 | 0.0031 | 0.0041 | 0.0161 | 0.0027 | 0.0044 | 0.0073 | 0.0023 | 0.0013 |
| 480 | 0.0008 | 0.0035 | 0.0050 | 0.0043 | 0.0041 | 0.0049 | 0.0061 | 0.018 | 0.0037 | 0.0054 | 0.0091 | 0.0031 | 0.0019 |

TABLE 2-continued

| Wavelength, nm | Component No. | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| 500 | 0.0008 | 0.0032 | 0.0025 | 0.0071 | 0.0059 | 0.0067 | 0.0091 | 0.0162 | 0.0056 | 0.0071 | 0.0107 | 0.0044 | 0.0033 |
| 520 | 0.0008 | 0.0048 | 0.0025 | 0.0111 | 0.0086 | 0.0103 | 0.0125 | 0.0154 | 0.0084 | 0.0087 | 0.0118 | 0.0064 | 0.0047 |
| 540 | 0.0008 | 0.0069 | 0.0025 | 0.0145 | 0.0110 | 0.0118 | 0.0148 | 0.0152 | 0.0107 | 0.0095 | 0.0121 | 0.0083 | 0.0063 |
| 560 | 0.0008 | 0.0106 | 0.0042 | 0.0181 | 0.0142 | 0.0138 | 0.0164 | 0.0135 | 0.0132 | 0.0098 | 0.0116 | 0.0108 | 0.0078 |
| 580 | 0.0008 | 0.0141 | 0.0042 | 0.0194 | 0.0161 | 0.0131 | 0.0157 | 0.0099 | 0.0138 | 0.0087 | 0.0099 | 0.0121 | 0.0087 |
| 600 | 0.0008 | 0.0144 | 0.0042 | 0.0180 | 0.0162 | 0.0105 | 0.0135 | 0.0068 | 0.0127 | 0.0070 | 0.0081 | 0.0120 | 0.0087 |
| 620 | 0.0007 | 0.0103 | 0.0033 | 0.0128 | 0.0142 | 0.0067 | 0.0088 | 0.0031 | 0.0087 | 0.0046 | 0.0055 | 0.0100 | 0.0076 |
| 640 | 0.0004 | 0.0048 | 0.0033 | 0.0062 | 0.0096 | 0.0028 | 0.0043 | 0.001 | 0.004 | 0.0026 | 0.0003 | 0.0064 | 0.0051 |
| 660 | 0.0003 | 0.0017 | 0.0025 | 0.0022 | 0.0045 | 0.0005 | 0.0016 | 0.0003 | 0.0013 | 0.0010 | 0.0015 | 0.0029 | 0.0024 |
| 680 | 0.0002 | 0.0006 | 0.0033 | 0.0011 | 0.0021 | 0.0003 | 0.0007 | 0.0001 | 0.0005 | 0.0002 | 0.0008 | 0.0013 | 0.0010 |
| 700 | 0.0001 | 0.0002 | 0.0017 | 0.0003 | 0.0007 | 0.0003 | 0.0002 | 0.0001 | 0.0002 | 0.0001 | 0.0003 | 0.0004 | 0.0003 |

Into 300 parts of water, is added 0.2 part of the aforementioned sample dye together with 10 parts of spun polyester yarn. The mixture is heated at 130° C. under applied pressure for 60 minutes to effect dyeing. After dyeing, the yarn is washed with hot water, then subjected to reduction clearing and subsequent drying. In a customary manner, 1 part of the dyed yarn is extracted with 50 parts of chlorobenzene. Individual components contained in the extract are separated and quantitatively determined by liquid chromatography under the aforementioned conditions of separation to select the components fixed onto the yarn. In the liquid chromatogram shown in FIG. 3, the components No. 1, 2, 3 and 7 are unfixed componentsto be 1.0.

Separation and quantitative determination of individual components of the standard dye and two or more representative samples are carried out under the same conditions of separation as described above. Using the ratio, Pn (Table 3), of separated individual component to main component thus determined with respect to the standard dye and representative sample, the mixing calculation is carried out according to the aforementioned formulas [1]. The absorbances of mixtures with respect to the standard dye and the representative sample are as shown in Tables 4 and 5, respectively.

TABLE 3

| Standard dye | | Representative sample | |
|---|---|---|---|
| Component No. | Ratio to main component (%) | Component No. | Ratio to main component (%) |
| 1 | 0.14 | 1 | 0.09 |
| 2 | 0 | 2 | 0 |
| 3 | 0 | 3 | 0 |
| 4 | 0.04 | 4 | 0.04 |
| 5 | 2.29 | 5 | 1.70 |
| 6 | 0.07 | 6 | 0.07 |
| 7 | 0.13 | 7 | 0.25 |
| 8 | 0.09 | 8 | 0.05 |
| 9 | 1.83 | 9 | 2.50 |
| 10 | 0.14 | 10 | 0.09 |
| 11 | 0.04 | 11 | 0.08 |
| 12 | 100.00 | 12 | 100.00 |
| 13 | 0.11 | 13 | 0.04 |

TABLE 4

| Dst, 400 = 0.1559 | Dst, 420 = 0.1775 |
|---|---|
| Dst, 440 = 0.2051 | Dst, 460 = 0.2408 |
| Dst, 480 = 0.3256 | Dst, 500 = 0.4697 |
| Dst, 520 = 0.6843 | Dst, 540 = 0.8790 |
| Dst, 560 = 1.1403 | Dst, 580 = 1.2811 |
| Dst, 600 = 1.2637 | Dst, 620 = 1.0557 |
| Dst, 640 = 0.6687 | Dst, 660 = 0.3017 |
| Dst, 680 = 0.1387 | Dst, 700 = 0.0433 |

TABLE 5

| Dsp, 400 = 0.1563 | Dsp, 420 = 0.1779 |
|---|---|
| Dsp, 440 = 0.2055 | Dsp, 460 = 0.2412 |
| Dsp, 480 = 0.3263 | Dsp, 500 = 0.4713 |
| Dsp, 520 = 0.6869 | Dsp, 540 = 0.8821 |
| Dsp, 560 = 1.1436 | Dsp, 580 = 1.2835 |
| Dsp, 600 = 1.2656 | Dsp, 620 = 1.0546 |
| Dsp, 640 = 0.6663 | Dsp, 660 = 0.3002 |
| Dsp, 680 = 0.1379 | Dsp, 700 = 0.0431 |

From the above values of absorbance and the aforementioned formulas [3], complementary tristimulus values QX, QY and QZ are calculated. The values obtained are

QX = 86.759
QY = 90.201
QZ = 26.389 for the standard dye and

QX = 86.602
QY = 90.080
QZ = 26.321 for the representative sample.

From the above tristimulus values and the aforementioned formulas [4], the complementary chromaticity coordinates xQ, yQ and the integrated optical density SQ are calculated. The values obtained are SQ = 203.349
xQ = 0.4267
yQ = 0.4436 for the standard dye and

SQ = 203.003
xQ = 0.4266
yQ = 0.4437 for the representative sample.

A complementary chromaticity diagram as shown in FIG. 4 is constructed from the above results. In FIG. 4, 1 pertains to the standard dye and 2 to the representative sample.

By means of the formula [5] the distribution curve of absorbance of the standard dye is transformed into the distribution curve of transmittance and the tristimulus values X, Y and Z are computed from the aforementioned formulas [6].

X = 30.141
Y = 32.058
Z = 74.119

The coordinates are transformed by means of formulas [7] into a uniform color scale such as, for example, CIE 1976 (L*a*b*) colorimetric system recommended by CIE.

$L^*(0) = 63.4180$
$a^*(0) = -0.9732$
$b^*(0) = -39.8531$

In the a*b* chromaticity coordinates of this colorimetric system, four chromaticity points a*(1), b*(1); a*(2), b*(2); a*(3), b*(3); and a*(4), b*(4) are given when the chromaticity point a*(0), b*(10) representing a hue difference and a saturation or brightness difference undergoes independently a change of one unit.

L*(1)=63.4180
a*(1)=−1.9730
b*(1)=−39.8286
L*(2)=63.4180
a*(2)=0.0264
b*(2)=−39.8775
L*(3)=63.4180
a*(3)=−0.9977
b*(3)=−40.8528
L*(4)=63.4180
a*(4)=−0.9489
b*(4)=−38.8534

Four sets of tristimulus values, X(1) ... X(4), Y(1) ... Y(4), and Z(1) ... Z(4), corresponding to the above four chromaticity points are calculated by the reverse transformation of formulas [7].

X(1)=29.8769
Y(1)=32.0580
Z(1)=74.0881
X(2)=30.4067
Y(2)=32.0580
Z(2)=74.1496
X(3)=30.1345
Y(3)=32.0580
Z(3)=75.3838
X(4)=30.1475
Y(4)=32.0580
Z(4)=72.8682

Spectral transmittance curves Tλ which represent these tristimulus values are computed by the method of computer color matching calculation for transparent color or by other methods (FIGS. 6 to 9).

The spectral transmittance curve Tλ is then transformed into the distribution curve of absorbance by the reverse transformation of formulas [5]. From the curve and formulas [3] and [4], complementary chromaticity coordinates of the chromaticity points xQ(0) ... xQ(4), yQ(0) ... yQ(4) are calculated.

xQ(0)=0.4306
yQ(0)=0.4309
xQ(1)=0.4324
yQ(1)=0.4303
xQ(2)=0.4288
yQ(2)=0.4314
xQ(3)=0.4343
yQ(3)=0.4335
xQ(4)=0.4271
yQ(4)=0.4282

The differences between the complementary chromaticity coordinates of the standard dye and those of the four chromaticity points obtained above, that is, ΔxQ(1) ... ΔxQ(4), ΔyQ(1) ... ΔyQ(4), are calculated and the relating formulas are derived.

ΔxQ(1)=0.0018-
ΔyQ(1)=0.0006
ΔxQ(2)=−0.0018
ΔyQ(2)=0.0005
ΔxQ(3)=0.0037
ΔyQ(3)=0.0026
ΔxQ(4)=−0.0035
ΔyQ(4)=−0.0027

In FIG. 10, 0 is complementary chromaticity coordinates of the standard dye and 1, 2, 3 and 4 represent the complementary chromaticity coordinates corresponding to a hue difference and brightness difference of 1.0.

In FIG. 10, a straight line is drawn through chromaticity point 0 at a mean inclination of the straight line connecting chromaticity points 0 and 1 and the straight line connecting chromaticity points 0 and 2 (the straight line drawn above can be substituted by the straight line connecting the chromaticity points 0 and 2; hereinafter referred to as constant brightness locus). A straight line parallel to the above drawn straight line is drawn through the complementary chromaticity point of the representative sample until it intersects at A a straight line drawn through chromaticity point 0 at a mean inclination of the straight line connecting chromaticity points 0 and 3 and the straight line connecting chromaticity points 0 and 4 (the above drawn straight line can be substituted by the straight line connecting chromaticity points 0 and 3; hereinafter referred to as constant hue locus). The coordinates of the intersection A are found to be xQ(A)=0.4268
xQ(A)=0.4436

Similarly, a straight line parallel to the constant hue locus is drawn through the complementary chromaticity coordinates until it intersects the constant brightness locus at B, the coordinates of which are found to be xQ(B)=0.4265
yQ(B)=0.4437

Using these values the required color difference of dye solution is calculated in terms of hue difference of solution and brightness difference of solution in the following way:

Hue difference =

$$\frac{\sqrt{[xQ(0) - xQ(B)]^2 + [yQ(0) - yQ(B)]^2}}{\sqrt{\{(|\Delta xQ(1)| + |\Delta xQ(2)|)/2\}^2 + \{(|\Delta yQ(1)| + |\Delta yQ(2)|)/2\}^2}} = 0.09$$

Brightness difference =

$$\frac{\sqrt{[xQ(0) - xQ(A)]^2 + [yQ(0) - yQ(A)]^2}}{\sqrt{\{(|\Delta xQ(3)| + |\Delta xQ(4)|)/2\}^2 + \{(|\Delta yQ(3)| + |\Delta yQ(4)|)/2\}^2}} = 0.02$$

The above operation is repeated by selecting several representative samples different from one another in proportions of coloring matter components.

Measurement of Color Difference of Dyeings on Representative Samples

Into 300 parts of water, are added 10 parts of spun polyester yarn and 0.2 part of the standard dye or each of the same representative samples as used above. The mixture is heated at 130° C. under applied pressure for 60 minutes to effect dyeing. After dyeing, the dyed yarn is washed with hot water and subjected to reduction clearing and subsequent drying. The color difference of dyeings of the representative sample against the standard dye is determined in terms of hue difference and brightness difference.

Figure 11:
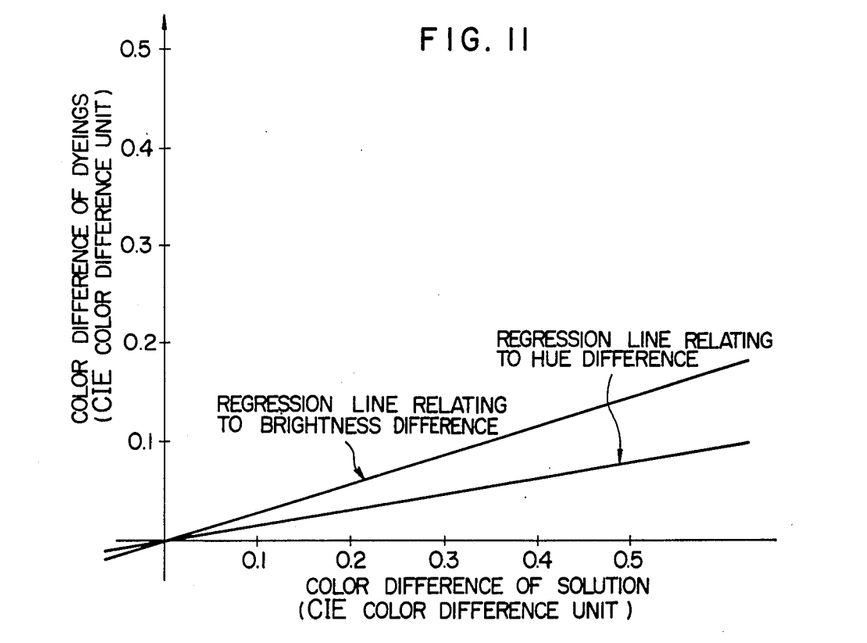
FIG. 11 represents the relation between the color difference of dyeings and the color difference of dye solution.

Determination of Relationship Between Color Difference of Dyeings and Color Difference of Dye Solution With Respect to Representative Sample Using the data of color difference of dyeings and the color difference of solution obtained above, regression analysis is performed to determine the relationship in the form of regression line between the color difference of dye solution and the color difference of dyeings with respect to representative samples (FIG. 11).

Measurement of Color Difference of Solution of Sample Dye

In a manner similar to that described previously, the color difference of solution of the sample dye is measured in terms of hue difference and brightness difference against the standard dye.

Prediction of Color Difference of Dyeings With Respect to Sample Dye

Using the color difference of solution of the sample dye obtained above, the predicted color difference of dyeings is obtained from the regression line. In Table 6 are shown both the predicted color difference thus obtained and the color difference obtained by actual dyeing with the sample dye.

TABLE 6

| | | CIE 1976 L*a*b* colorimetric system | | |
|---|---|---|---|---|
| | | Color difference of solution | Predicted color difference of dyeings | Result of dyeing |
| Sample No. 1-1 | Hue | 0.52 | 0.08 | 0.07 |
| | Brightness | 0.10 | 0.03 | 0.03 |

The values of predicted color difference of dyeings obtained on another sample dye Nos. (1-2)–(1-8) are shown in Table 7 together with the results of dyeing in side-by-side arrangement.

TABLE 7

| | | CIE 1976 L*a*b* colorimetric system | | |
|---|---|---|---|---|
| Sample No. | | Color difference of solution | Predicted color difference of dyeings | Result of dyeing |
| 1-2 | Hue | 1.32 | 0.21 | 0.21 |
| | Brightness | 0.53 | 0.15 | 0.14 |
| 1-3 | Hue | 0.32 | 0.05 | 0.05 |
| | Brightness | 0.63 | 0.18 | 0.16 |
| 1-4 | Hue | 1.24 | 0.20 | 0.21 |
| | Brightness | 0.98 | 0.27 | 0.27 |
| 1-5 | Hue | 0.25 | 0.04 | 0.04 |
| | Brightness | 0.17 | 0.05 | 0.04 |
| 1-6 | Hue | 0.43 | 0.07 | 0.07 |
| | Brightness | 0.50 | 0.14 | 0.14 |
| 1-7 | Hue | 0.85 | 0.14 | 0.13 |
| | Brightness | 0.60 | 0.17 | 0.16 |
| 1-8 | Hue | 0.52 | 0.08 | 0.09 |
| | Brightness | 0.30 | 0.08 | 0.08 |

As is seen from the above experimental results, the predicted values of color difference of dyeings obtained by the above method (predicted color difference of dyeings) show satisfactory agreement with the values obtained by actual dyeing (result of dyeing).

EXAMPLE 2

Measurement of Color Difference of Solution

Measurements are performed with respect to C.I. Disperse Blue 79, a disperse dye difficultly soluble or insoluble in water. The absorbance coefficient of individual component contained in the dye (Table 8) and the ratio of separated component to main component of the standard dye and the representative sample are measured as in Example 1 (Table 9).

TABLE 8

| Wavelength, nm | Component No. | | | | | |
|---|---|---|---|---|---|---|
| | 3 | 6 | 7 | 11 | 12 | 15 |
| 400 | 0.0021 | 0.0020 | 0.0035 | 0.0010 | 0.0018 | 0.0016 |
| 420 | 0.0023 | 0.0023 | 0.0040 | 0.0013 | 0.0021 | 0.0025 |
| 440 | 0.0027 | 0.0027 | 0.0049 | 0.0019 | 0.0025 | 0.0035 |
| 460 | 0.0032 | 0.0033 | 0.0061 | 0.0027 | 0.0030 | 0.0039 |
| 480 | 0.0043 | 0.0044 | 0.0083 | 0.0041 | 0.0041 | 0.0041 |
| 500 | 0.0062 | 0.0063 | 0.0111 | 0.0061 | 0.0057 | 0.0042 |
| 520 | 0.0089 | 0.0088 | 0.0136 | 0.0082 | 0.0077 | 0.0049 |
| 540 | 0.0114 | 0.0109 | 0.0147 | 0.0092 | 0.0093 | 0.0061 |
| 560 | 0.0148 | 0.0135 | 0.0146 | 0.0090 | 0.0108 | 0.0082 |
| 580 | 0.0169 | 0.0144 | 0.0122 | 0.0071 | 0.0107 | 0.0100 |
| 600 | 0.0172 | 0.0138 | 0.0093 | 0.0054 | 0.0096 | 0.0103 |
| 620 | 0.0153 | 0.0112 | 0.0050 | 0.0030 | 0.0070 | 0.0089 |
| 640 | 0.0106 | 0.0069 | 0.0020 | 0.0012 | 0.0039 | 0.0062 |
| 660 | 0.0052 | 0.0031 | 0.0006 | 0.0004 | 0.0016 | 0.0037 |
| 680 | 0.0025 | 0.0014 | 0.0002 | 0.0002 | 0.0007 | 0.0022 |
| 700 | 0.0008 | 0.0005 | 0.0002 | 0.0001 | 0.0002 | 0.0010 |

TABLE 9

| Standard dye | | Representative sample | |
|---|---|---|---|
| Component No. | Ratio to main component (%) | Component No. | Ratio to main component (%) |
| 1 | 0.14 | 1 | 0.14 |
| 2 | 0 | 2 | 0 |
| 3 | 0.18 | 3 | 0.62 |
| 4 | 0 | 4 | 0 |
| 5 | 0 | 5 | 0 |
| 6 | 6.09 | 6 | 8.94 |
| 7 | 0.18 | 7 | 0.16 |
| 8 | 0 | 8 | 0 |
| 9 | 0 | 9 | 0 |
| 10 | 0 | 10 | 0 |
| 11 | 1.59 | 11 | 1.07 |
| 12 | 100.00 | 12 | 100.00 |
| 13 | 0 | 13 | 0 |
| 14 | 0 | 14 | 0 |
| 15 | 0.14 | 15 | 0.10 |

The distribution curve of absorbance for each component is obtained by multiplying the absorbance coefficient of each component by the ratio of corresponding component to main component, except that in the case of undyeing components 1 and 2, the absorbance coefficient is multiplied by the dyeing coefficient which is zero in such a case. The complementary chromaticity coordinates, xQ, and yQ and the integrated optical density, SQ, corresponding to each component are calculated from the above values and the formulas [3] and [4]. The coordinates xQ, yQ and the integrated optical density Sq of each component of the standard dye and the representative dye are found to be as shown in Tables 10 and 11, respectively.

TABLE 10

| No. | LC No. | xQ | yQ | SQ |
|---|---|---|---|---|
| 1 | 3 | 0.4318 | 0.4420 | 0.4910 |
| 2 | 6 | 0.4094 | 0.4431 | 14.606 |
| 3 | 7 | 0.3179 | 0.4379 | 0.475 |
| 4 | 11 | 0.3348 | 0.4706 | 2.312 |
| 5 | 12 | 0.3835 | 0.4446 | 188.05 |
| 6 | 15 | 0.3960 | 0.3920 | 0.25 |

TABLE 11

| No. | LC No. | xQ | yQ | SQ |
|---|---|---|---|---|
| 1 | 3 | 0.4318 | 0.4420 | 1.69 |
| 2 | 6 | 0.4094 | 0.4431 | 21.44 |
| 3 | 7 | 0.3179 | 0.4379 | 0.423 |
| 4 | 11 | 0.3348 | 0.4706 | 1.552 |
| 5 | 12 | 0.3835 | 0.4446 | 188.05 |

TABLE 11-continued

| No. | LC No. | xQ | yQ | SQ |
|---|---|---|---|---|
| 6 | 15 | 0.3960 | 0.3920 | 0.18 |

The complementary coordinates xQ, yQ and the integrated optical density SQ of the standard dye are obtained by the color mixing calculation on the complementary chromaticity coordinates according to the formulas [2] in the following way using the values obtained above for the components.

The mixing of complementary chromaticity coordinates of LC No. 3 and those of LC No. 6 gives the following formulas:

$$xQ(2) + \{xQ(1) - xQ(2)\} \times \{SQ(1)/(SQ(1) + SQ(2))\}$$
$$= {}^*xQ(2)$$

$$yQ(2) + \{yQ(1) - yQ(2)\} \times \{SQ(1)/(SQ(1) + SQ(2))\}$$
$$= {}^*yQ(2)$$

$$SQ(1) + SQ(2) = {}^*SQ(2)$$

The mixing of the above mixed coordinates with the complementary chromaticity coordinates of LC No. 7 leads to the following formulas:

$$xQ(3) + \{{}^*xQ(2) - xQ(3)\}\{x\{{}^*SQ(2)/(SQ(2) + SQ(3))\}$$
$$= {}^*xQ(3)$$

$$yQ(3) + \{{}^*yQ(2) - yQ(3)\}x\{{}^*SQ(2)/({}^*SQ(2) + SQ(3))\}$$
$$= {}^*yQ(3)$$

$$SQ(2) + SQ(3) = {}^*SQ(3)$$

In the above formulas each numeral in parentheses is the corresponding LC No. and the mark * means the mixed complementary chromaticity coordinates. In a similar manner, the resultant mixed coordinates are mixed successively with the complementary chromaticity coordinates of LC Nos. 11, 12 and 15 to obtain the complementary chromaticity coordinates of the standard dye:

xQ = 0.3848
yQ = 0.4447
SQ = 206.184

The complementary chromaticity coordinates and the integrated optical density of the representative sample are similarly obtained:

xQ = 0.3860
yQ = 0.4446
SQ = 213.335

Figure 13:
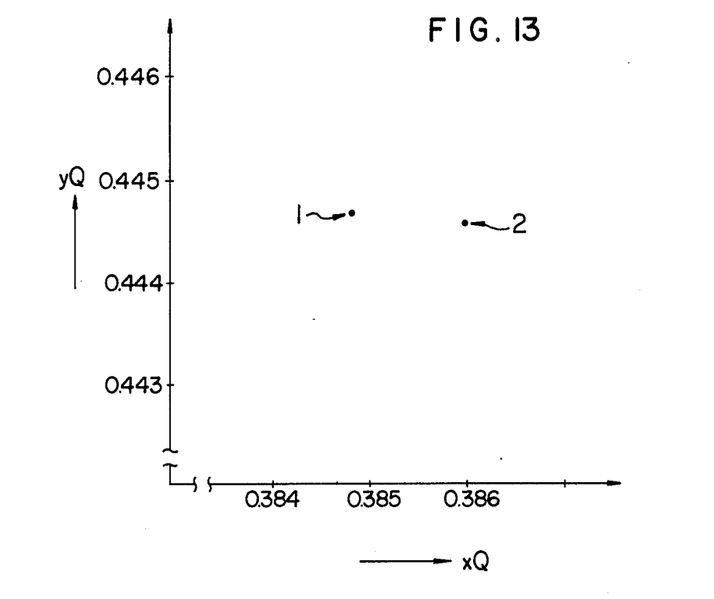

On plotting the above values, there is obtained a complementary chromaticity diagram shown in FIG. 13, wherein 1 refers to the standard dye and 2 to the representative sample.

By means of the formula [5] the distribution curve of absorbance of the standard dye of the same family is transformed into the distribution curve of transmittance and the tristimulus values X, Y, Z are computed from the formula [6].

X = 35.447
Y = 35.638
Z = 71.104

The coordinates are transformed by means of formulas [7] into a uniform color scale such as, for example, CIE 1976 ($L^*a^*b^*$) colorimetric system recommended by CIE.

$L^*(0) = 66.2705$
$a^*(0) = 5.6865$
$b^*(0) = -32.5069$

In the $a^*b^*$ chromaticity coordinates of this colorimetric system, four chromaticity points $a^*(1)$, $b^*(1)$; $a^*(2)$; $b^*(2)$; $a^*(3)$, $b^*(3)$; and $a^*(4)$, $b^*(4)$ are given when the chromaticity point $a^*(0)$, $b^*(0)$ representing a hue difference and a staturation or brightness difference undergoes independently a change of one unit.

$L^*(1) = 66.2705$
$a^*(1) = 4.7:15$
$b^*(1) = -32.6792$
$L^*(2) = 66.2705$
$a^*(2) = 6.6715$
$b^*(2) = -32.3346$
$L^*(3) = 66.2705$
$a^*(3) = 5.8588$
$b^*(3) = -33.3919$
$L^*(4) = 66.2705$
$a^*(4) = 5.5142$
$b^*(4) = -31.5219$

Then, 4 sets of tristimulus values, X(1) ... X(4), Y(1) ... Y(4), and Z(1) ... Z(4), correspondint to he above four chromaticity points are calculated by the reverse transformation of formulas [7].

X(1) = 35.1570
Y(1) = 35.6380
Z(1) = 71.3151
X(2) = 35.7386
Y(2) = 35.6380
Z(2) = 70.8933
X(3) = 35.4979
Y(3) = 35.6380
Z(3) = 72.3163
X(4) = 35.3961
Y(4) = 35.6380
Z(4) = 69.9053

Spectral transmittance curves Tλ which represent these tristimulus values are computed by the method of computer color matching calculation for transparent color or by other methods. The spectral transmittance curve Tλ is then trasformed into the distribution curve of absorbance by the reverse transformation of formulas [5]. From the resulting curve and formulas [3] and [4], complementary chromaticity coordinates of each chromaticity point zQ(0) ... xQ(4), yQ(0) ... yQ(4) are calculated.

zQ(0) = 0.3991
yQ(0) = 0.4262
xQ(1) = 0.4018
yQ(1) = 0.4257
xQ(2) = 0.3965
yQ(2) = 0.4268
xQ(3) = 0.4024
yQ(3) = 0.4294
xQ(4) = 0.3959
yQ(4) = 0.4231

The differences between the complementary chromaticity coordinates of the standard dye and those of the four chromaticity points obtained above, that is, ΔxQ(1) ... ΔxQ(4), ΔyQ(1) ... ΔyQ(4), are calculated and the relating formulas are derived.

ΔxQ(1) = 0.0027
ΔyQ(1) = -0.0005
ΔxQ(2) = -0.0026
ΔyQ(2) = 0.0006
ΔxQ(3) = 0.0033
ΔyQ(3) = 0.0032
ΔxQ(4) = -0.0032
ΔyQ(4) = -0.0031

In a manner similar to that described in Example 1, the constant hue locus and the constant brightness locus are determined and a straight line parallel to the latter line is drawn through the complementary chromaticity coordinates of the representative sample to intersect the constant hue locus at A, the coordinates of which are then determined.

$xQ(A) = 0.3849$
$yQ(A) = 0.4448$

Another straight line parallel to the constant hue locus is drawn also through the complementary chromaticity coordinates of the representative sample to intersect the constant brightness locus at B and the coordinates of B are then determined.

$xQ(B) = 0.3859$
$yQ(B) = 0.4445$

The color difference of dye solution in terms of hue difference and brightness difference is determined from these values.
Hue difference $= 0.40$
Brightness difference $= 0.04$ The above operation is repeated by selecting several representatibe samples different from one another in proportions of coloring matter components.

Measurement of Color Difference of Dyeings on Representative Samples

Into 300 parts of water, are added 10 parts of spun polyester yarn and 0.2 part of the standard dye or each of the same representative samples as used above. The mixture is heated at 130° C. under applied pressure for 60 minutes to effect dyeing. After dyeing, the dyed yarn is washed with hot water and subjected to reduction clearing and subsequent drying. The color difference of dyeings of each representative sample against the standard dye is determined in terms of hue difference and brightness difference.

Determination of Relationship Between Color Difference of Dyeings and Color Difference of Dye Solution With Respect to Representative Sample Using the data of color difference of dyeings and the color difference of solution obtained above, regression analysis is performed to determine the relationship in the form of regression line between the color difference of dye solution and the color difference of dyeings. Regression lines represented by the following equations are obtained:

Hue difference of dyeings $= 0.30 \times$ (hue difference of solution)
Brightness difference of dyeings $= 1.77 \times$ (brightness difference of solution)

Measurement of Color Difference of Solution of Sample Dye

In a manner similar to that described previously, the color difference of solution of the sample dye is measured in terms of hue difference and brightness difference against the standard dye.

Prediction of Color Difference of Dyeings With Respect to Sample Dye

The predicted color difference of dyeings of the sample dye is obtained from the equations obtained above and the measured color difference of solution of the sample dye. In Table 12 are shown both the predicted color difference thus obtained and the color difference obtained by actual dyeing with the sample dye.

TABLE 12

| | | CIE 1976 L*a*b* colorimetric system | | |
|---|---|---|---|---|
| | | Color difference of solution | Predicted color difference of dyeings | Result of dyeing |
| Sample No. 2-1 | Hue | 0.21 | 0.06 | 0.06 |
| | Brightness | 0.16 | 0.28 | 0.27 |

The values of predicted color difference of dyeings obtained on other samples Nos. 2-2 to 2-8 are shown in Table 13 together with the results of dyeing in side-by-side arrangement.

TABLE 13

| | | CIE 1976 L*a*b* colorimetric system | | |
|---|---|---|---|---|
| Sample No. | | Color difference of solution | Predicted color difference of dyeings | Result of dyeing |
| 2-2 | Hue | 0.73 | 0.22 | 0.21 |
| | Brightness | 0.25 | 0.44 | 0.43 |
| 2-3 | Hue | 0.41 | 0.12 | 0.12 |
| | Brightness | 0.07 | 0.12 | 0.12 |
| 2-4 | Hue | 0.50 | 0.15 | 0.16 |
| | Brightness | 0.17 | 0.30 | 0.29 |
| 2-5 | Hue | 0.78 | 0.23 | 0.22 |
| | Brightness | 0.35 | 0.62 | 0.62 |
| 2-6 | Hue | 0.10 | 0.03 | 0.02 |
| | Brightness | 0.13 | 0.23 | 0.21 |
| 2-7 | Hue | 0.08 | 0.02 | 0.03 |
| | Brightness | 0.15 | 0.27 | 0.26 |
| 2-8 | Hue | 0.41 | 0.12 | 0.12 |
| | Brightness | 0.08 | 0.14 | 0.14 |

As is seen from the above experimental results the predicted values of color difference of dyeings obtained by the above method (predicted color difference of dyeings) show satisfactory agreement with the values obtained by actual dyeing (result of dyeing).

EXAMPLE 3

Measurements are performed with respect to C. I. Disperse Blue 139, a disperse dye difficultly soluble or insoluble in water.

The distribution curve of absorbance in the visible spectrum range is determined by absorption spectrophotomety on the solution prepared by dissolving 0.005 part of a standard dye or a representative sample in 80% acetonitrile and making up to 100 parts with 80% acetonitrile.

From the curve obtained above and the formulas [3] and [4], complementary chromaticity coordinates xQ, yQ are calculated. For the standard dye, they are
$xQ = 0.3626$
$yQ = 0.4404$
and for the representative dye
$xQ = 0.3605$
$yQ = 0.4406$ As in Example 1 or 2, the distribution curve of absorbance for the standard dye is transformed into the transmittance curve by means of formula [5] and tristimulus values X, Y and Z are obtained by means of formulas [6]. The tristimulus values are transformed by means of formulas [7] into a uniform color scale such as, for example, CIE 1976 (L*a*b) colorimetric system recommended by CIE.

In the a*b* chromaticity coordinates of the above CIE colorimetric system, four chromaticity points are given when the chromaticity point representing the hue difference and the saturation or brightness difference undergoes independently a change of one unit. Then, 4 sets of tristimulus values corresponding to said four chromaticity points are calculated by the reverse transformation of formulas [7]. Spectral transmittance curves which give the above tristimulus values are computed by the method of computer color matching calculation for transparent color or by other methods. The spectral transmittance curve is then transformed into the distribution curve of absorbance by the reverse transformation of formula [5]. From the resulting curve and formulas [3] and [4], complementary chromaticity coordinates of each chromaticity point are calculated. The difference between the complementary chromaticity coordinates of the standard dye and those of the four chromaticity points obtained above, that is $\Delta xQ(1) ... \Delta xQ(4)$, $\Delta yQ(1) ... \Delta yQ(4)$, are calculated and the relating formulas are derived.

$\Delta xQ(1) = 0.003$
$\Delta yQ(1) = -0.0002$
$\Delta xW(2) = -0.003$
$\Delta yQ(2) = 0.0002$
$\Delta xW(3) = 0.0028$
$\Delta yQ(3) = 0.0031$
$\Delta xQ(4) = -0.0028$
$\Delta yQ(4) = -0.0031$ In a manner similar to that described in Example 1 or 2, the coordinates of the intersection A on the constant hue locus are determined.

$xQ(A) = 0.3627$
$yQ(A) = 0.4405$

Likewise, the coordinates of the intersection B on the contant brightness locus are determined.

$xQ(B) = 0.3604$
$yQ(B) = 0.4405$

The color difference of dye solution is determined from the above values

Hue difference = 0.72
Brightness difference = 0.02

The above sequence of operation is repeated on several representative samples different from one another in porportions of coloring matter components.

On the other hand, in a manner similar to that in Example 1 or 2, the color difference of dyeings of the representative sample against the standard dye is determined. Using the data of color difference of dyeings and the color difference of dye solution, regression analysis is performed to determine the relationship in the form of regression line between the color difference of dye solution and the color difference of dyeings. Regression lines represented by the following equations are obtained:

Hue difference of dyeings = 0.19 × (hue difference of solution)
Brightness difference of dyeings = 0.09 × (brightness difference of solution)

Using the equations, predicted color difference of dyeings of the sample dye is obtained from the color difference of solution of the sample dye determined in a similar manner to that described above. In Table 14 are shown both the predicted color difference of dyeings and the color difference obtained by actual dyeing with the sample dye.

TABLE 14

| | | CIE 1976 L*a*b* colorimetric system | | |
|---|---|---|---|---|
| | | Color difference of solution | Predicted color difference of dyeings | Result of dyeing |
| Sample No. 3-1 | Hue | 0.35 | 0.07 | 0.07 |
| | Brightness | 0.20 | 0.02 | 0.02 |

The values of predicted color difference of dyeings obtained on other samples Nos. 3—2 to 3—8 are shown in Table 15 together with the results of dyeing in side-by-side arrangement.

TABLE 15

| | | CIE 1976 L*a*b* colorimetric system | | |
|---|---|---|---|---|
| | | Color difference of solution | Predicted color difference of dyeings | Result of dyeing |
| 3-2 | Hue | 0.13 | 0.02 | 0.04 |
| | Brightness | 0.42 | 0.04 | 0.06 |
| 3-3 | Hue | 0.06 | 0.01 | 0.02 |
| | Brightness | 0.07 | 0.01 | 0 |
| 3-4 | Hue | 0.55 | 0.10 | 0.12 |
| | Brightness | 0.24 | 0.02 | 0.04 |
| 3-5 | Hue | 0.70 | 0.13 | 0.14 |
| | Brightness | 0.65 | 0.06 | 0.07 |
| 3-6 | Hue | 0.17 | 0.03 | 0.02 |
| | Brightness | 0.31 | 0.03 | 0.04 |
| 3-7 | Hue | 0.88 | 0.17 | 0.17 |
| | Brightness | 0.50 | 0.05 | 0.05 |
| 3-8 | Hue | 0.15 | 0.02 | 0.03 |
| | Brightness | 0.10 | 0.01 | 0 |

As is seen from the above experimental results, the predicted values of color difference of dyeings obtained by the above method (predicted color difference of dyeings) show satisfactory agreement with the values obtained by actual dyeing (result of dyeing).

EXAMPLE 4

Predicted color difference of dyeings is obtained in the same manner as in Example 1 or 2, except that the dye used is C.I. Reactive Red 111, a watersoluble dye. The predicted color difference is compared with the result of actual dyeing as shown in Table 16.

TABLE 16

| | | CIE 1976 L*a*b* colorimetric system | | |
|---|---|---|---|---|
| Sample No. | | Color difference of solution | Predicted color difference of dyeings | Result of dyeing |
| 4-1 | Hue | 0.25 | 0.20 | 0.20 |
| | Brightness | 0.13 | 0.19 | 0.20 |
| 4-2 | Hue | 0.14 | 0.11 | 0.10 |
| | Brightness | 0.25 | 0.36 | 0.36 |
| 4-3 | Hue | 0.07 | 0.06 | 0.06 |
| | Brightness | 0.07 | 0.10 | 0.11 |
| 4-4 | Hue | 0.15 | 0.12 | 0.12 |
| | Brightness | 0.20 | 0.29 | 0.29 |
| 4-5 | Hue | 0.23 | 0.18 | 0.17 |
| | Brightness | 0.35 | 0.51 | 0.50 |
| 4-6 | Hue | 0.13 | 0.10 | 0.10 |
| | Brightness | 0.10 | 0.15 | 0.14 |
| 4-7 | Hue | 0.09 | 0.07 | 0.08 |
| | Brightness | 0.12 | 0.17 | 0.17 |
| 4-8 | Hue | 0.23 | 0.18 | 0.18 |
| | Brightness | 0.30 | 0.44 | 0.44 |

As is seen from the experimental results, the predicted values of dyeing result (predicted color difference of dyeings) obtained according to this invention show satisfactory agreement with the result of actual dyeings (result of dyeing).

What is claimed is:

1. A method for measuring the color difference between a sample dye and a standard dye by testing the color properties of both dyes, which comprises the steps of isolating from dyes of the same family each of the coloring matter components having a dyeing affinity and having the possibility of existing in the dye; measuring the spectral absorbance or spectral transmittance of each component in solution form to obtain data 1 to be filed; selecting two or more dyes having such compositions that the proportions of the coloring matter components are different to some degrees from those of the sample dye, then quantitatively analyzing said prepared or selected dyes and a standard dye (a dye assumed to be a standard for comparison) for their coloring matter components; calculating the spectral absorbance or spectral transmittance of each of said prepared or selected dyes and said standard dye by the method of color mixing calculation in accordance with the composition of each dye using the results of above quantitative analysis and the filed data 1 of spectral absorbance or spectral transmittance of each coloring matter component; calculating the color difference in solution between each of said selected dyes and the standard dye; dyeing with said selected dyes and the standard dye to determine the color difference by colorimetry; determining statistically the numerical relationship between the color difference of dye solution and the color difference of dyeings to acquire data 2 (the data 1 and 2 being the base data to be collected in advance for the purpose of using in the subsequent evaluation of color); after collecting the foregoing data 1 and 2, analyzing quantitatively the sample dye for the coloring matter components; calculating the tristimulus values of the solution of sample dye from the results of said quantitative analysis and the spectral absorbance or spectral transmittance of each coloring matter component (data 1); calculating the color difference in solution from the calculated tristimulus values and the tristimulus values of the standard dye (which are determined previously or simultaneously); and converting the calculated color difference of solution into the color difference of dyeings by means of the determined relationship between the color difference of solution and the color difference of dyeings (data 2).

2. A method according to claim 1, wherein using a standard dye and two or more representative samples, the relationship between the color difference (relative to the standard dye) of solution and the color difference (relative to the standard dye) of dyeings is determined for said representative samples according to the following procedure:

(1) each of the components contained in the dyes of the same family is separated and collected separately by chromatography; for each separated component the spectral absorbance curve is measured and from each curve a spectral absorbance curve per unit of each component content is derived;

(2a) the calculation for color mixing is performed by using the absorbance curve per unit of content obtained in (1) and the results of quantitative analysis of the separated components with respect to the standard dye and representative samples of the same family as that of the standard dye factor is made at this stage unless it has been made in (1). a color coordinate system representing the value of color property unaffected by the variation in concentration of the solution, such as the values of complementary chromaticity coordinates, is selected; complementary tristimulus values QX, QY, QZ are calculated for the standard dye and the sample dye by the same method of calculating the tristimulus values using the absorbance in place of the transmittance; from the calculated complementary tristimulus values, there are obtained complementary chromaticity coordinates xQ, yQ and the integrated optical density SQ, which is the sum of QX, QY, QZ;

(2b) a dye is selected from the dyes of the same family and tristimulus values X, Y, Z are calculated from the spectral transmittance curve of the dye; these values are then transformed into a suitable uniform color scale; in the coordinate diagram of this color system, four sets of tristimulus values given by points that undergo a change of one unit independently in hue difference and in saturation (or brightness) difference from the point of the dye are calculated and the corresponding transmittance curve is derived by color mixing calculation; the transmittance curve is transformed into the distribution curve of absorbance to obtain the complementary chromaticity coordinates of each chromticity point; from the difference between these coordinates and the complementary chromaticity coordinates of the dye selected above, the relation of the hue difference and saturation (or brightness) difference to the difference in complementary chromaticity coordinates in the uniform color scale is established; by referring to the established relationship, the color difference of representative sample relative to the standard dye is calculated in terms of hue difference and saturation (or brightness) difference ; the foregoing operation is repeated on two or more, preferably several, representative dyes different from one another in proportions of coloring matter components;

(3) dyeings are prepared from the standard dye and the representative samples of which the color difference of solution have been determined above; from the dyeings, there is obtained the color difference , of the representative dye relative to the standard dye;

(4) the relationship between the color difference of dye solution determined in (2) and the color difference of dyeings determined in (2) and the color difference of dyeings determined in (3) is found in terms of hue difference and saturation (or brightness) difference;

(5) using the standard and the sample dye, the color difference of solution of the sample dye relative to the standard dye is calculated in terms of hue difference and saturation (or brightness) difference, as described in (2);

(6) the color difference of dyeings of the sample dye is predicted from the color difference of solution of the sample dye obtained in (5) and the relationship established in (4).

3. A method according to claim 2, wherein high speed liquid chromatography is used to separate individual components contained in a dye.

4. A method according to claim 2, wherein the absorbance curve per unit of each component is corrected in step (1) using a weighting factor pertaining to dyeing affinity.

5. A method according to claim 2, wherein the absorbance curve per unit of each component is corrected in step (2a) using a weightng factor pertaining to dyeing affinity.

* * * * *